F. R. GRAEBER, C. T. ENTRIKIN & G. W. GARMAN.
CHECK OPERATED MACHINE.
APPLICATION FILED AUG. 10, 1907.
907,230.
Patented Dec. 22, 1908.
5 SHEETS—SHEET 2.
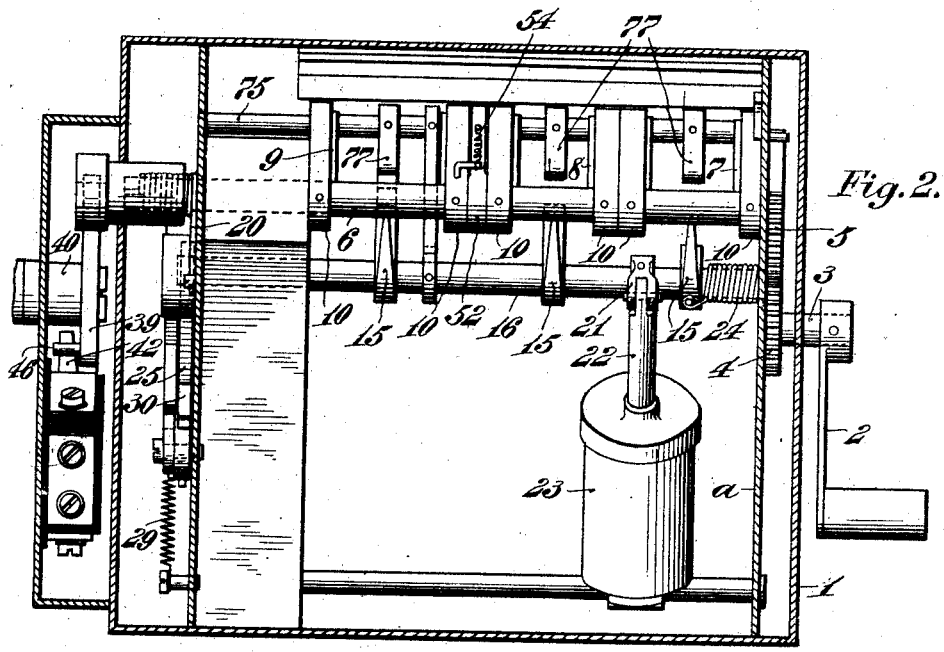
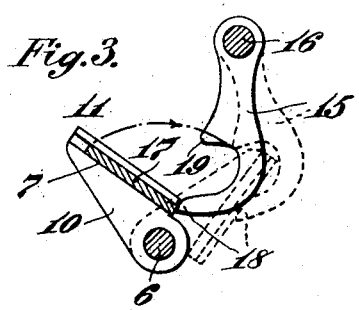
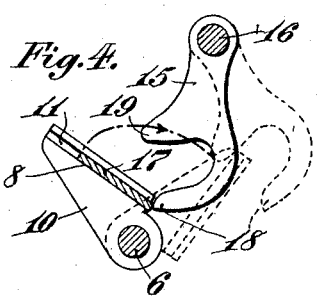
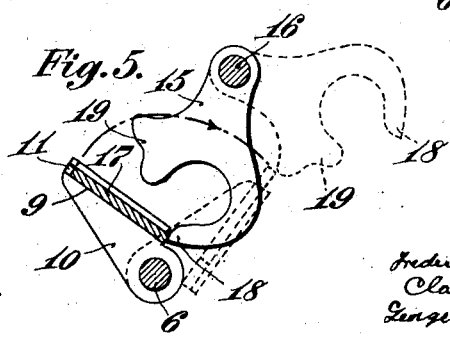

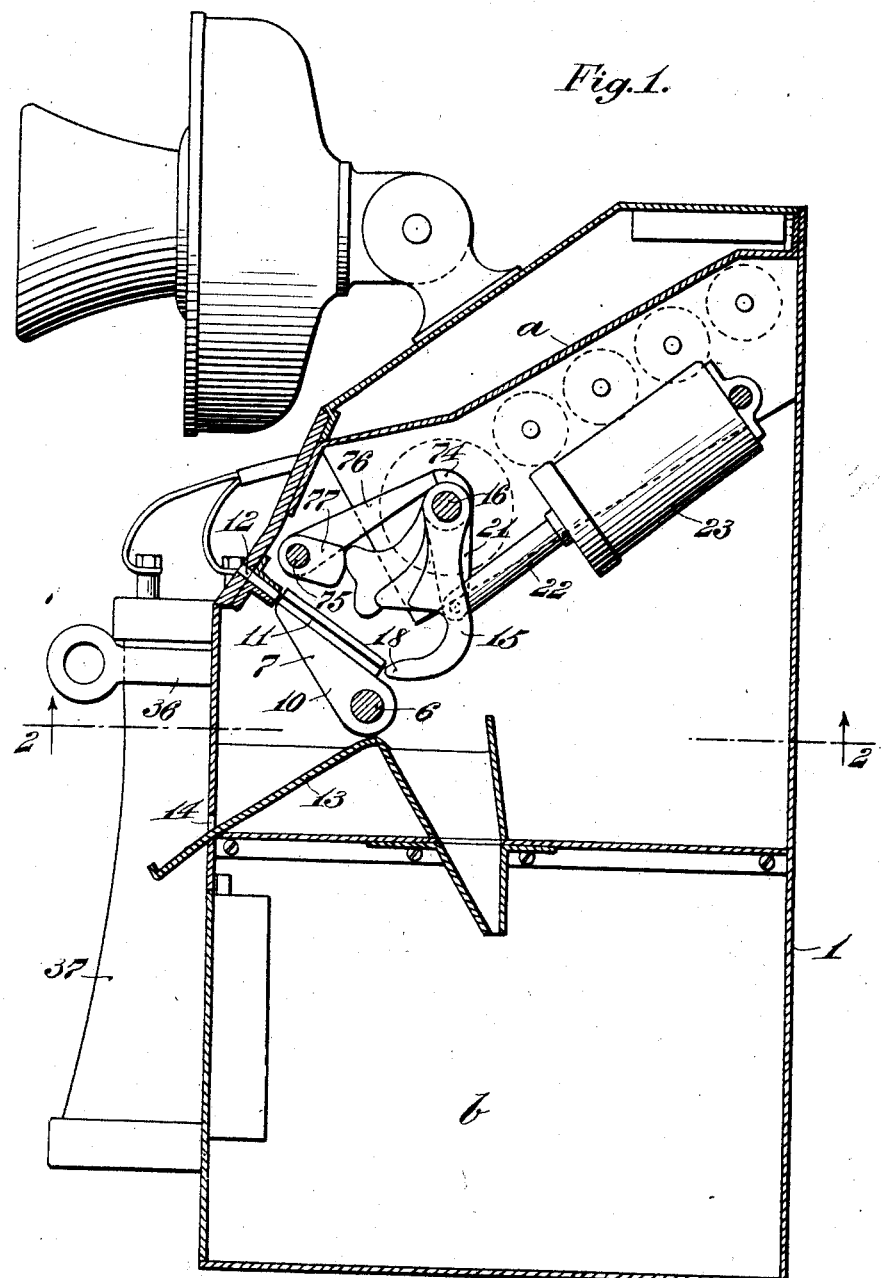

F. R. GRAEBER, C. T. ENTRIKIN & G. W. GARMAN.
CHECK OPERATED MACHINE.
APPLICATION FILED AUG. 10, 1907.
907,230.
Patented Dec. 22, 1908.
5 SHEETS—SHEET 3.
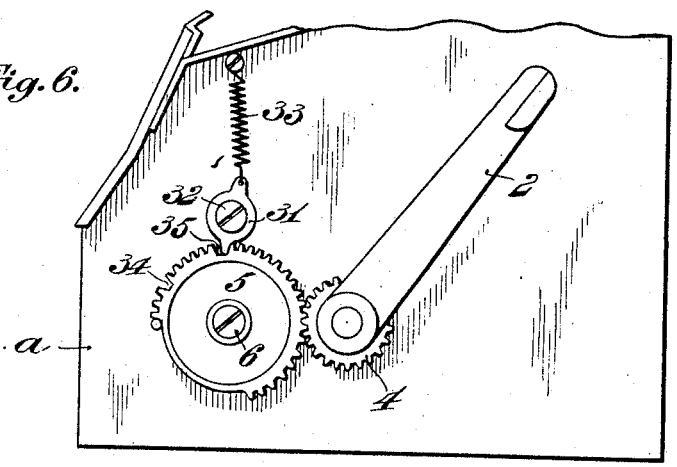
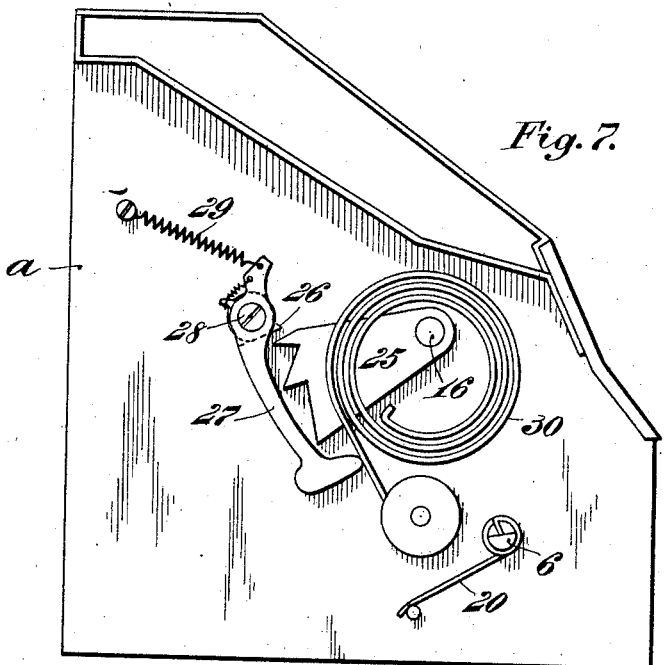

F. R. GRAEBER, C. T. ENTRIKIN & G. W. GARMAN.
CHECK OPERATED MACHINE.
APPLICATION FILED AUG. 10, 1907.

907,230.

Patented Dec. 22, 1908.

5 SHEETS—SHEET 4.

WITNESSES:

INVENTORS

ATTORNEY.

F. R. GRAEBER, C. T. ENTRIKIN & G. W. GARMAN.
CHECK OPERATED MACHINE.
APPLICATION FILED AUG. 10, 1907.

907,230.

Patented Dec. 22, 1908.

5 SHEETS—SHEET 5.

UNITED STATES PATENT OFFICE.

FREDERICK R. GRAEBER, CLARENCE T. ENTRIKIN, AND GEORGE W. GARMAN, OF PHILADELPHIA, PENNSYLVANIA.

CHECK-OPERATED MACHINE.

No. 907,230.     Specification of Letters Patent.     Patented Dec. 22, 1908.

Application filed August 10, 1907. Serial No. 387,977.

*To all whom it may concern:*

Be it known that we, FREDERICK R. GRAEBER, CLARENCE T. ENTRIKIN, and GEORGE W. GARMAN, citizens of the United States, and residents of the city and county of Philadelphia, State of Pennsylvania, have invented certain new and useful Improvements in Check-Operated Machines, of which the following is a specification.

Our invention relates to improvements in check-operated machines and more particularly to improvements in check operated machines used as automatic pay stations for telephone service, and the objects of our invention are 1st, to furnish a means for immovably locking the operating handle or lever of the machine until the receiver is lifted from its hook or support; 2d, to furnish a means for locking the registering and alarm mechanism so as to be inoperative except by a coin carried by the coin carrier; 3d, to furnish an improved means for locking the coin slots of the machine after the insertion of a coin and until said coin has passed through the machine; 4th to furnish an improved and simplified form of alarm for indicating to the operator at the central station the value of the coin passed to the machine, and 5th to furnish certain other details of construction that will be hereinafter fully set forth.

Figure 8:
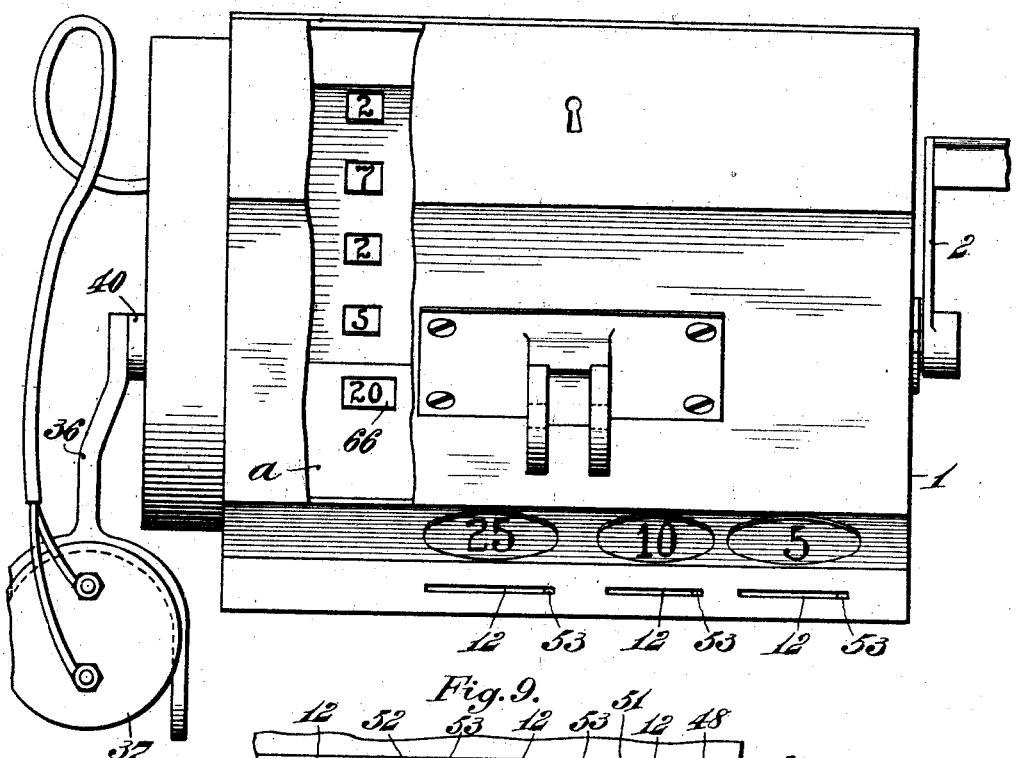
Figure 9:
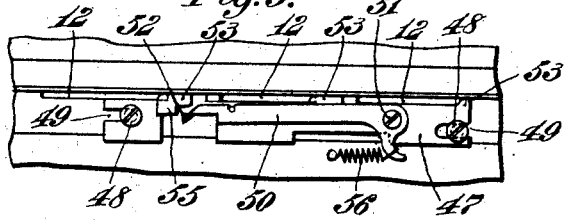
Figure 10:
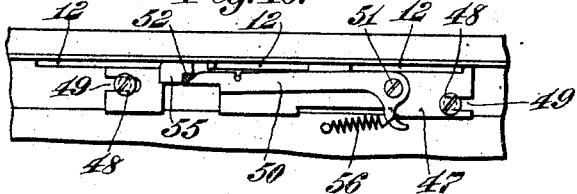
Figure 11:
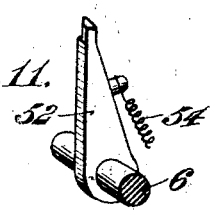
Figure 12:
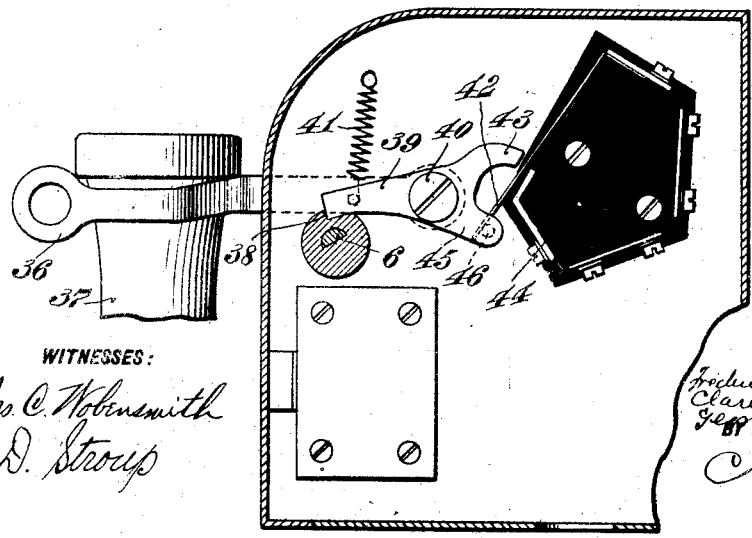

In the accompanying drawings forming part of this specification, and in which similar letters of reference indicate similar parts throughout the several views; Figure 1, is a vertical transverse section through the inclosing case of our machine showing, in side elevation, the several parts; Fig. 2, a section of Fig. 1 on line 2—2, looking upwards; Figs. 3, 4 and 5, side elevations of the three several forms of coin holders shown in Figs. 1 and 2, and of the coin carriers for each of these holders: Fig. 6, a side elevation of the inner case of the machine showing means for transferring motion from operating lever to coin carrier shaft: Fig. 7, a side elevation of the alarm for indicating to the operator in the central station the value of the coin deposited in the machine; Fig. 8, a top view of the machine, partly broken away, showing the slots in the case for introducing coins to the machine; Fig. 9, a rear elevation of the coin locking out mechanism when in its first or open position; Fig. 10, a similar view of the coin locking out mechanism when in its second, or locking out, position; Fig. 11, a perspective view of the arm for holding locking out mechanism in its second position; Fig. 12, a side elevation showing upper part of receiver, hook or lever for carrying the receiver, means, operated by movement of lever, for locking, and unlocking operating shaft of the machine, and contact making and breaking device operated by receiver carrying hook or lever.

1 is the inclosing case of the machine. 2, a crank carried upon a stud 3 which carries a pinion 4, Fig. 6, which meshes with and drives a pinion 5, Figs. 2 and 6, which is fast to a main shaft 6 which is carried in suitable bearings in a frame *a* removably carried by the case 1.

The main shaft 6 carries the coin carriers 7—8—9 of which there may be any number. In the present case three are shown, 7 being for 5 cent pieces, 8 for 10 cent pieces, and 9 for 25 cent pieces, except for differences in dimensions as is required for coins of different denominations the carriers are identical in shape. They consist each of two side arms 10 carried by shaft 6, the inner sides of the tops of which are furnished with grooves 11 for engaging and holding opposite sides of the coin. In their normal position the grooves 11 are opposite and in register with the slots 12 in the case 1 through which the coins are passed to the machine. Should a coin of improper denomination be passed through one of the slots 12, a 10 cent or a 5 cent coin be passed into the 25 cent slot for instance, its opposite sides will not be simultaneously engaged by the grooves 11 in the 25 cent carrier 9 and the coin will fall down between the arms 10 of this carrier, will drop upon the slide 13, Fig. 1, and will pass out of the case 1 through a slot 14 and will be returned to the operator. If the coin be of an acceptable size, its opposite edges will be held by the slots 11 and it will pass down these slots until it is engaged by a holder 15 which is fast to a shaft 16. There is a separate holder 15 for each coin carrier and while they all perform the same function they are shaped so that each will cause a different rotation of the shaft 16 for an equal throw of the shaft 6 which carries the coin carriers 10; this unequal rotation of the shaft 16 being necessary in order to cause the alarm ringing mechanism, which is actuated through the movements of shaft 16, to sound separate alarms or signals for the several coin carriers.

The normal position of the several coin carriers 10 and of the coin holders 15 is shown in full lines in Figs. 3, 4 and 5. 17 shows in each figure a central cross section of the coin in each holder and, as before stated, the carrier shown in Fig. 3 is for 5 cent coins, that shown in Fig. 4 for 10 cent coins, and that shown in Fig. 5 for 25 cent coins. It will be observed that the lower end or point 18 of each holder engages the top of the lower edge of its coin leaving a space between the holder 10 and this point, hence if a slug of less than the thickness of the real coin be passed into the machine it will run down past the point 18 of the holder and will pass harmlessly into the body of the machine. As slugs are usually made of card board or tin the utility of this arrangement will be apparent.

If an acceptable coin be passed through one of the coin slots 12 in case 1 to one of the carriers 10, it will slide down the grooves 11 in the carrier until its movement is arrested by its engaging the point 18 of the holder 15. The telephone receiver being lifted from its hook, presently to be described, the operating lever 2 of the machine is rocked causing, through pinions 4 and 5, a rocking of shaft 6 and coin carriers 10 towards the holders 15. The coin carried by one of the carriers and held therein by the point 18 of the holder 15 acting in connection with this carrier now rides over the point 18 and, as the carrier is further turned, its upper face presently engages the upper point 19 of the holder 15 and a further movement of the carrier 10 causes the coin to bear against and push backward the point 19 and the holder 15 causing the shaft 16 to turn upon its axis until the lever 2 has been thrown to the full extent of its stroke. During this movement the holder 15 has been moved until it takes the position shown in dotted lines in Figs. 3, 4 and 5 at which time the coin being entirely out of contact with the points 18—19 of the holder, falls from the carrier to the coin receptacle in the case 1. The lever 2 being released a spring 20, Figs. 2 and 7, returns the shaft 6 and connected parts quickly to their first position.

21 is an arm carried by shaft 16 which is connected to the piston rod 22 of a dashpot 23 the function of which is to check the return movement of the shaft 16 after its operation by a coin as described, the rotation of the shaft 16 winding up a spring 24, Fig. 2, the unwinding of which returns the shaft 16 and connected parts to their original position. To shaft 16 is secured a ratchet 25, Figs. 2 and 7, having as many teeth as there are coin carriers in the machine, in the present case three.

26 is a spring pawl pivotally carried by a striker 27 which is pivotally supported upon a stud 28. Upon an upward movement the teeth of ratchet 25 engage and move the tooth of pawl 26 out of their path, upon a downward movement of the ratchet 25 its teeth engage the tooth of pawl 26 and pressing down upon this tooth cause it and the pawl to rotate the striker 27 upon its pivot 28. As soon as each tooth of the ratchet passes the pawl a spring 29 suddenly returns the striker to its first position and causes it to engage and ring a gong 30. As before stated the shaft 16 is rotated to different degrees by the several coins in their carriers owing to the differences in shape of the coin holders 15, hence upon each operation of the machine the gong will be sounded one or more times as different degrees of rotation of the shaft 16 may turn ratchet 25 to bring one or more of its teeth into operative contact with the pawl 26.

For satisfactory operation of the machine, it is essential that each movement of the operating lever 2 be a complete one, a partial movement of this lever results in an incomplete cycle of movements in the machine and may serve to seriously disarrange it. In order that the lever 2 may have to be moved to its full stroke before returning to its initial position, we have devised the simple and efficient stop shown in Fig. 6. The pinion 5 is engaged by a detent 31 which is rotatably carried upon a pivot 32 and maintained in an operative position by a spring 33. At points corresponding with the ends of the throw of the pinion 5 one or more teeth are removed, as at 34—35, so as to permit the detent 31 to change its direction at these points. If the detent be in the opening 35, as shown in Fig. 6, and the lever 2 be moved to the left the top of the pinion 5 will be moved to the right and the top of the detent to the left and its lower end will drag over the teeth of the pinion.

If the movement of the lever 2 be arrested before completing its entire stroke the detent 31 will engage the teeth of the pinion 5 and prevent it reversing its movement thus locking the lever 2 against a return movement. When the detent 31 reaches the opening 34, at which point the lever 2 has completed its stroke, its direction can change so as to permit the return of the several parts to their first positions. In other words the detent 31 prevents a reverse movement of the lever 2, in either direction, until it has completed its full stroke.

In private homes, particularly, the operating lever of a call box is frequently operated by children as a form of amusement. In order to prevent this abuse of the machine we have furnished a lock for this lever which is as follows:—The end of the shaft 6 adjacent to the hook 36 which carries the receiver 37 is furnished with a notch 38, Fig. 12, which is adapted to be engaged, when the hook is depressed by the weight of the receiver, by an arm 39 which is rigidly attached to the shaft 40 to which the hook 36 is rigidly attached. 41 is a spring for lifting the hook 36 and the arm 39 when the receiver is lifted from the hook. When the receiver 37 is upon the hook 36 the arm 39 is lowered so that it engages the notch 38 in shaft 6 preventing any rotation thereof until the receiver and hook be lifted. The inner end of the arm 39 forms, in connection with a spring 42, the switch for automatically connecting the current upon the lifting of the receiver and for automatically breaking it upon placing the receiver on the hook. The inner end of the arm is bifurcated; upon lifting the receiver the part 43 of the arm engages the spring 42 and causes it to engage plate 44, thus completing the circuit. When the outer end of the hook 36 is lowered by the weight of the receiver the part 43 of the arm 39 is moved away from the spring 42 and in order that the spring may be positively lifted from the plate 44 the lower end 45 of the arm carries an insulated pin 46 engaging the under side of the pin and lifting it clear of the plate when the receiver is placed upon the hook. This feature of our invention will form the subject of a separate application for patent.

In connection with our device as above described we have furnished a means for preventing the introduction of a second coin to the machine while there is one in the coin carriers. The open condition of this device is shown in Fig. 9, the closed condition in Fig. 10, both of these figures being views of the device as seen from the inside of the case looking upward and outward—47 is a plate movably secured to the inside of the front of the case by means of screws 48 which pass through slots 49 in the plate. 50 is a trigger pivoted to plate 47 at 51. 52 an arm carried on shaft 6, the point of which is adapted to engage and operate the trigger as will be presently described. The plate 47 is so constructed that when it is in its normal position projections, as 53, Figs. 8, 9 and 10, will appear one at each of one of the ends of the coin slots 12. If a coin be placed into any one of the slots it will engage a projection 53, and in the present case, will force the plate 47 and the trigger 50 to the right. Up to the time of the insertion of the coin in the slot the wedge shaped point of the arm 52 has been lying against the outer side of the point of the trigger 50, as shown in Fig. 9, but as soon as the plate and trigger are moved to the right the point of arm 52, being drawn forward by a spring 54, drops in front of the point of trigger and against a part 55 of the plate 47, as shown in Fig. 10, and blocks a movement of the plate in either direction. As soon as the coin passes through the slot 12, and simultaneously with the dropping of the point of arm 52 in front of point of arm 50, the plate 47 and arm 50 are returned to their first positions by a spring 56 and the parts 53 of the plate, the plate itself being now locked against movement in either direction, prevent the insertion of a coin in any of the slots 12. When the shaft 6 is rocked to rock the coin carriers the arm 52 is rocked with it and its point, now behind the trigger 50 as shown in Fig. 10, draws the free end of the trigger outwards until the point of the arm passes it when the spring 56 returns the trigger to its first position. When the shaft 6 returns to its first position the point of the arm 52 will rest upon the outer side of the point of trigger 50 as shown in Fig. 9 and will maintain this position until the plate 47 and trigger 50 are moved aside by the insertion of a coin in one of the coin slots 12 as before described. Should a coin now be passed into any of the coin slots it will drop to plate 13 and will be returned to the operator.

As is best shown in Fig. 1, the points 19 of the several coin holders 15 are of different lengths, that of the five cent holder being the shortest while that of the 25 cent holder is the largest and widest, the purpose of this being to cause the several holders to be thrown different distances for an equal movement of the coin carriers; this results in different signals being sounded for each of the different coins as before described.

74 is a stop carried by the coin holder shaft 16.

75 is a shaft carrying an arm 76 adapted to engage stop 74.

77 are arms carried by shaft 75 and placed so as to be about midway of each of the coin carriers as shown in Fig. 2.

The arm 76 and the stop 74 form a means for preventing the operation of the coin holders by a wire inserted through the slots 12 and the arms 76—77 are so placed that it would be very difficult, if not impossible, to tamper with them from without the case. When the coin carriers are rocked a coin in any one of them will engage one of the arms 77 and will rock the shaft 75 so as to cause the arm 76 to disengage the stop 74 and release the shaft 16 so that it may be rocked through the coin holders 15.

Having thus described our invention we claim as new and desire to secure by Letters Patent:—

1. In a check operated machine, in combination, an inclosing case, a shaft carried by said case, coin carriers carried by said shaft, a lever without said case for rocking said shaft, and a lever pivotally supported by, passing through, and operated from without said case adapted in one position to lock said shaft against movement and in another position to release said shaft.

2. In a check-operated machine, in combination, a shaft, coin carriers carried by said shaft, means for rocking said shaft and carriers, a second shaft, coin holders carried by said second shaft, a stop carried by said second shaft, a third shaft, an arm carried by said third shaft adapted to engage the stop on said second shaft, and arms carried by said third shaft adapted to be engaged by a coin in said carriers to rock said third shaft to cause said stop-engaging arm to disengage said stop on said second shaft.

3. In a check operated mechanism, in combination, a shaft, coin carriers carried by said shaft the coin slots therein being open at both ends, a second shaft, coin holders carried by said shaft furnished with two points the lower of which is adapted to engage the edge of the coin when the carrier is in its first position and the upper of which is adapted to engage the side of the coin when the carrier is rocked forward and to hold the coin until the carrier has completed its forward rocking movement, and means for rocking said coin carrier shaft.

4. In a check-operated machine, in combination, a shaft, coin carriers carried by said shaft, means for rocking said shaft and carriers, a second shaft, a stop carried by said second shaft, a third shaft, the arm carried by said shaft adapted to engage said stop, and an arm carried by said third shaft adapted to be engaged and moved by a coin in the coin carriers upon a forward movement of the latter to rock said third shaft and disengage the stop engaging arm and stop.

5. In a check-operated machine, in combination, a shaft, coin carriers carried by said shaft, means for rocking said shaft and coin carriers, a second shaft, coin holders carried by said second shaft, having points of different length adapted each to be engaged and moved by the coins in its corresponding coin holder, a ratchet carried by said second shaft furnished with teeth to correspond with each coin holder and coin carrier, a pawl adapted to be inoperatively engaged by the teeth of said ratchet on a movement of said second shaft in one direction and operatively engaged by said teeth upon a movement of said shaft in the other direction, a striker operated by said pawl, and a gong operated by said striker.

6. In a check-operated machine, in combination, a case furnished with slots for the passage of the coins, a shaft, means for rocking said shaft, coin carriers carried by said shaft and, in their normal position, registering with said slots, a plate upon the inside of said case furnished with projections closing off one of the ends of said slots and movable lengthwise of said slots, a trigger pivotally carried by said plate, and an arm carried by said coin carriers shaft adapted to rest against and be supported by the point of said trigger before the passage of a coin through said coin slots, and to drop down in front of said trigger upon the passage of a coin through said slots to lock said plate against movement and said slots against the passage of other coins until said coin carriers have been moved out of register with them.

7. In a check-operated machine, in combination, a case furnished with slots for the passage of coins, a shaft, coin carriers carried by said shaft and in their first position registering with said slots, means for rocking said shaft and coin carriers, a plate within said case furnished with projections partly closing said coin slots adapted to be moved lengthwise by the passage of a coin through said slots, a spring for returning said plate to its first position after the passage of a coin through a slot, and means for locking said plate until the coin carriers have been moved out of register with said coin slots.

8. The combination in a check-operated machine, of a case furnished with slots for the passage of coins, a shaft, coin carriers carried by said shaft, means for rocking said shaft and carriers, a plate within said case adapted to partly close said coin slots and movable lengthwise by the passage of a coin through said slots, a trigger pivotally carried by said plate, a spring for returning said plate to its first position after the passage of a coin and for closing said trigger, and an arm carried by said coin carrier shaft adapted to engage said trigger to lock said plate against movement after a passage of a coin through said coin slots.

FREDERICK R. GRAEBER.
CLARENCE T. ENTRIKIN.
GEORGE W. GARMAN.

Witnesses:
WILLIAM J. BURNS,
CHAS. A. RUTTER